Nov. 18, 1947.   B. F. LANGER   2,431,260

TORQUE MEASURING DEVICE

Filed Aug. 25, 1944

WITNESSES:

INVENTOR
Bernard F. Langer.
BY
ATTORNEY

Patented Nov. 18, 1947

2,431,260

UNITED STATES PATENT OFFICE 2,431,260

TORQUE MEASURING DEVICE

Bernard F. Langer, Pittsburgh, Pa., assignor to Westinghouse Electric Corporation, East Pittsburgh, Pa., a corporation of Pennsylvania Application August 25, 1944, Serial No. 551,221

6 Claims. (Cl. 73—136)

This invention relates generally to electrical strain-sensitive pickup devices and more particularly to such devices wherein the variation in, or change of, electrical properties of, material bonded or otherwise firmly secured to be strained by a test specimen or object subjected to a stress and thereby strained, is utilized to determine the actual stress or strain of the specimen or object.

In certain of its aspects this invention is related to a copending application of F. W. Godsey, Jr., et al., Serial No. 551,220, filed on the same date as this application and entitled, "Strain devices."

The invention as hereafter described, by way of illustration, utilizes electrical conductors as the strain-reactive elements, the electrical resistance properties of which are changed when the conductors are strained. Such strain-reactive elements, hereinafter referred to as wire filaments, are well known in the art and are widely used in the field of strain measurement, hence, specific discussion of their characteristics, the material from which they are made and their dimensions is believed unnecessary. It suffices to state that the strain-reactive wire filaments employed in the present invention have resistance properties which change, within limits, of course, linearly with the applied straining force and that such resistance change is linear through zero. That is, the calibration curve of the wire filaments resistance change with strain is linear throughout the range of straining forces from the maximum allowable compression force to the maximum allowable tension force.

Strain-reactive wire filaments have been used with some degree of success in the past in measuring the strain or stress of various structural members and have been of considerable aid to the engineer in determining actual stress magnitudes in structural configurations to which a rigid mathematical stress analysis could not readily be applied. Their use in measuring torsional stresses in rotating shafts, however, except under controlled laboratory conditions, is not ordinarily productive of reliable results, since the electrical energy for the rotating wire filament has in the past been supplied through the medium of slip ring and brush assemblies. Such assemblies are usually satisfactory in the ordinary application for energizing rotating windings and the like; however in applications, such as strain measurement where the electrical quantity indicative of the stress or strain is of a fairly low energy level, the inherent variations of the electrical characteristics in brush and slip ring assemblies may introduce large electrical errors, which may entirely swamp the electrical quantity to be measured. In some applications of strain gauges to rotating shafts, for example, the output shafts of engines or shafts forming a part of the gearing system internally of the engine, the strain sensitive devices must operate either in an oil bath or an oil spray. Slip ring and brush assemblies are ordinarily not practical under such operating conditions. Furthermore, in such installations, what amounts to a major operation on the engine, insofar as gaining entrance to the engine crank case or transmission housing is concerned, merely to replace a faulty brush or make brush adjustments, is necessary. As a result, particularly on shaft installations in which vibration is present or oil immersion of the strain sensitive device necessary, the application of wire filament strain gauges has not been found entirely satisfactory.

The physical advantages afforded by the strain-reactive wire filament in strain measurement, for example, compactness, lightness of weight, simplicity, ease of installation, etc., make this type of element particularly desirable for use in measuring or sensing shaft torsion in aircraft power plant systems.

Accordingly it is a principal object of this invention to provide a strain measuring system embodying a strain-reactive wire filament as the strain-sensitive element in which errors resulting from unwanted electrical changes caused by component elements of the system are minimized.

Another and equally important object of this invention is to provide a strain-sensitive device for a rotating shaft, embodying a strain-reactive wire filament as the strain-sensitive element, in which electrical energy is inductively supplied to the rotating strain-reactive wire filament.

Further separate and combined objects of this invention are to provide a strain-sensitive device of the character referred to which is light in weight, compact and simple in construction, insensitive to temperature changes and to changes in electrical properties of the shaft with strain and to other unwanted properties effecting electrical errors.

A specific object of this invention is to provide a device of the character referred to in which the shaft is magnetically shielded from the system.

Other objects and advantages will become more apparent from a study of the following specification when considered in conjunction with the accompanying drawings in which.

The present invention comprises a strain-reactive wire filament wound in the form of a helical winding and secured to be strained by the shaft, the strain of which is to be determined, and which is inductively coupled to a stationary primary winding. The electrical changes of the secondary winding comprising the strain-reactive wire filament reflected in the primary winding are utilized to determine the strain or stress of the shaft. A sleeve of material of high electrical conductivity functioning in effect as a short circuited winding is utilized to shield the primary winding flux from the shaft.

Figure 1:
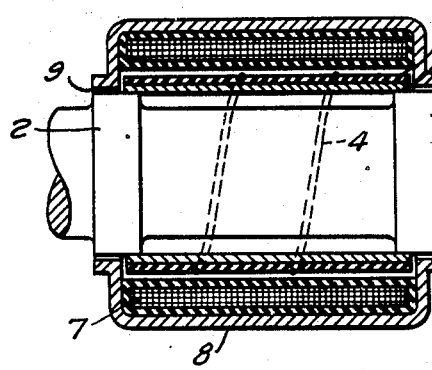
Figure 1 is a sectional view of a strain-sensitive pickup device embodying the principles of this invention.

The specific structure is illustrated in Fig. 1 in which a shaft 1, the torque of which is to be ascertained or determined, is provided with a pair of rings 2. A sleeve 3a of material of high-electrical conductivity such as copper has the extremities thereof secured to the rings 2. Thus when the shaft is subjected to torque and torsional deflection thereof occurs, the sleeve 3a is strained in an amount corresponding to the shaft strain. About this sleeve and securely bonded thereto by a suitable insulating medium, such as a layer of insulating material 3b, is a winding 4 of strain-reactive material. The layer of insulating material 3b is preferably although not necessarily a form of powdered iron, usually made by making powdered iron with a phenol formaldehyde resin and forming the mixture to the desired shape. Such a powdered iron product has high electrical resistance properties and a permeability of, for example, ten. The winding 4 may be secured within the electrical insulating material 3b or secured upon the insulating material in any suitable manner. The winding is wound in the form of a helix about the shaft in one direction only and has its extremities 5 joined by a length of electrical conductor 6 which may or may not be of the same material as that utilized in the helical winding. This short-circuiting conductor, which may be a separate conductor or a part of the wire filament, is preferably so connected across the extremities of the wire filament helix that it is not strained by torsional deflection, bending or tension or compression deflections of the shaft. The only elements to be strained are the wire filament helix or winding and sleeve 3a.

Stationarily concentrically disposed about the short-circuited wire filament winding 4 is an annular winding 7. This winding is enclosed within an annular housing 8 of magnetic material, preferably, pressed sheet metal which is flanged at its axial extremities to closely encircle but not touch the shaft rings 2. A pair of annular airgaps 9 having constant magnetic characteristics are thus formed between the housing and the shaft ring.

Figure 2:
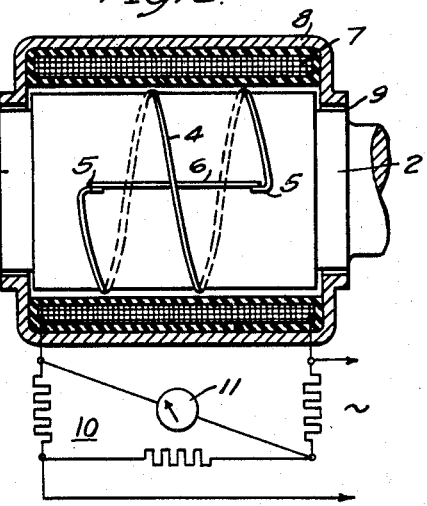
Fig. 2 is a partial sectional view of the device of Fig. 1 showing the manner in which the strain-reactive wire filament is wound.

The stationary annular winding 7 as shown in Fig. 2 is one leg of a conventional Wheatstone bridge circuit 10 in which the resistance and reactance components are balanced for zero torque of the shaft. The bridge circuit is energized by any suitable source of alternating current, preferably, although not necessarily of constant frequency indicated generally by the sinusoidal wave. A suitable indicating instrument as 11 is connected across the galvanometer terminals of the bridge circuit to be energized by the electrical unbalance thereof.

The construction hereinbefore described provides in effect a reactor which has for its primary the annular winding 7, for its secondary the short-circuited strain-reactive wire filament winding 4 and for its magnetic circuit the annular housing 8 and the airgrap between the flanges of the extremities thereof. If a form of powdered iron, as previously mentioned, is utilized as the medium to which or by which the wire filament is secured to the shaft the magnetic circuit then, of course, includes this material. The electrical load of the secondary is the ohmic resistance of the wire filament which varies with the strain of the shaft.

This strain-reactive wire filament 4 may be secured in any suitable manner to be strained by straining movements of the sleeve 3a. For example, it may be bonded directly to the sleeve by means of an insulating cement to prevent short-circuiting between the winding turns; it may be bonded, as shown, to an electrical insulating sleeve as 3b, which may or may not include magnetic material and which in turn is bonded to the sleeve 3a. It may be laminated between layers of insulating material suitably bonded to the sleeve, it may be molded in an insulated sleeve bonded to the sleeve 3a, etc. Such expedients, however, form no part of this invention. In any case any suitable means for insulatedly securing the wire filament secondary winding to the sleeve 3a such that it is efficiently linked by the primary magnetic field will suffice.

The purpose of the sleeve 3a is to prevent the magnetic field produced by the primary winding 7 from linking the shaft. Any flux tending to flow in the shaft induces current flows in the sleeve 3a, which functions in effect as a single turn short-circuited winding, in such a direction that a magnetomotive force in opposition to the magnetomotive force produced by the primary winding is had. By properly matching the primary winding and the single turn short-circuited sleeve it is possible to substantially balance the opposed magnetic forces in the shaft. Thus, the total magnetic flux in the shaft is substantially zero, and for all practical purposes changing electrical properties of the shaft tending to produce a change in the magnetic flux in the shaft, have no effect or in no way reflect their characteristics in the primary winding. In this connection, it should be noted, if powdered iron is utilized upon the sleeve 3a as the electrical insulating medium and at the same time to form a magnetic flux path, that such material is obtainable which has a very low if not a zero electrical response to strain. Thus no electrical changes from this source are reflected in the primary winding. In view of such expedients the only electrical change sensed by the primary winding is that resulting from the resistance change of the secondary winding when subjected to strain.

Assuming now that torque is transmitted from left to right of the shaft in a counterclockwise direction it will be apparent that each increment of length of the wire filament secondary is subjected to a tension force. As a result, the resistance of the secondary winding increases to some new value indicative of the torsional load transmitted by the shaft. In a broad sense this resistance change effects an impedance change of the secondary winding which is reflected in the primary winding. Since the bridge circuit is balanced for primary winding impedance at zero torque of the shaft, the impedance change reflected therein unbalances the bridge circuit and causes a voltage difference to appear across the galvanometer terminals thereof proportional to the strain in torque of the shaft. By suitably calibrating the indicating instrument in ft. lbs., a direct reading of the shaft torque may be obtained.

Another and more specific way of considering the operation of this device is as follows: Assuming the torque transmitting conditions of the preceding paragraph and a corresponding increase in secondary winding resistance, it will be understood that a reduction in induced secondary current occurs. This results in a drop in the magnetomotive force produced by the secondary winding and as follows, a drop in the back electromotive force induced in the primary winding. This in effect produces a drop in primary impedance which is measured across the galvanometer or output terminals of the bridge circuit.

It is, of course, essential that losses in coupling of the primary and secondary wingings be kept at a minimum. That is, the coefficient of mutual inductance of the windings should be as close an approach to unity as is possible. Some losses will occur due to leakage flux and possible slight eddy current loses. These losses will also slightly vary depending upon the density of the magnetic flux linking the coils. Such a condition may be minimized by proper matching of the coils. In any event non-linearity of change of the electrical properties of the primary winding with shaft strain resulting from air-gap losses may conveniently be compensated by proper calibration of the metering system, since, the actual magnetic losses throughout the range of flux densities, corresponding to the operating range of shaft strain, may experimentally or analytically be determined. In short, while the actual change in electrical properties of the primary winding may not be linearly proportional to the strain of the shaft, the actual curve of the proportionality of response can be made to closely approximate a linear function, and this curve retains its characteristics throughout the entire operating range of the device.

The fundamental embodiment of the invention illustrated in Fig. 1, while insensitive to changing electrical characteristics of the shaft, is not insensitive to changes in ambient temperature and to response of the secondary winding to strains resulting from shaft bending, end thrust, etc. These unwanted variables may be compensated by utilizing a second winding similar to the primary winding 7 to compensate the winding 7 for ambient temperature changes, or by utilizing winding and wire filament materials having a very low and preferably a zero response to temperature changes, and by suitably mounting the shaft or, for that matter, the shaft sleeve so that these elements may be loaded only in torque. One type of material which is strain reactive and has a practically negligible temperature coefficient of restrictivity at ordinary temperatures, is an alloy of copper and nickel. This material is satisfactory for application in the winding 7 and as the strain reactive wire filament 4.

Figure 3:
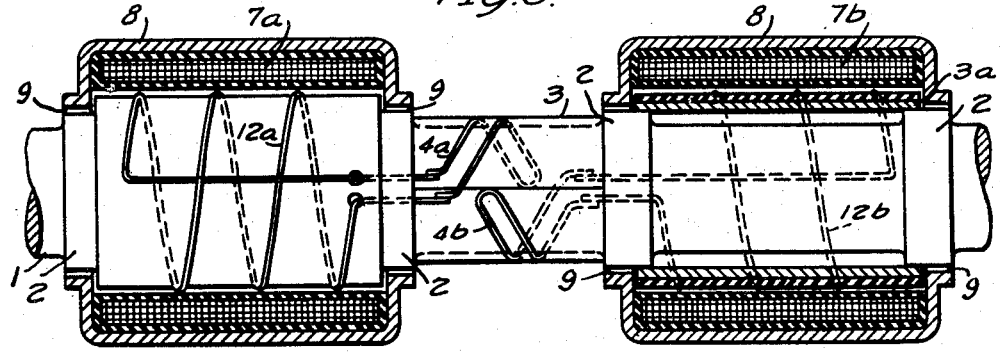
Fig. 3 is a modification of the invention of Fig. 1, providing in effect an increased sensitivity or response to strain and compensation for unwanted effects.

It is preferred, however, to compensate the unwanted variables in the manner illustrated in Fig. 3. In addition the embodiment of the invention illustrated in Fig. 3 in effect, doubles the sensitivity to strain of the pickup device as a whole. This does not mean that the sensitivity of the wire filaments to strain is increased since the response of the individual wire filaments may be assumed for convenience of description, to be the same as that of Fig. 1. The doubling of the sensitivity is accomplished by reversing the helix of one secondary winding with respect to the other, thus placing one secondary winding in tension and the other secondary winding in compression, and thereafter utilizing the differential of the reflected electrical effects in the primary windings to obtain an indication of the shaft strain.

While the specific structure of the modification of the invention illustrated in Fig. 3, insofar as the secondary elements are concerned differs from that of Figs. 1 and 2, there is no change in the principle of operation of the strain-sensitive device and it is to be understood that the manner in which unwanted electrical changes, resulting from temperature changes and electrical changes resulting from unwanted shaft strains are compensated, is contemplated in connection with the invention of Figs. 1 and 2, since, it requires merely the addition of a unit, such as shown in Fig. 2 having a winding insulatedly secured to the sleeve, such as 3a, with its helix reversed in direction from that of the other secondary winding.

In Fig. 3 the strain-reactive wire filaments 4a and 4b are removed from the magnetic field produced by the primary winding and are, in this instance, energized by the currents induced in the secondary windings 12a and 12b. The secondary windings may comprise any suitable number of turns of ordinary electrical conductor and are insulatedly supported to rotate with the shaft. The supporting of these windings is preferably, although not necessarily, so arranged that the windings are not strained when the shaft is torsionally deflected. This may be accomplished by the simple expedient of securing the sleeves to but one of the shaft rings and allowing their other extremities to rotate relative to the shaft rings upon which they are supported.

The strain-responsive wire filaments are of suitable length to provide the desired ohmic resistance and have their extremities connected to the extremities of the secondary winding 12a and 12b. They are then wound in the desired direction in the form of a double helix about the shaft, one in the right hand screw direction and the other in the left hand screw direction and suitably bonded thereto by means of the insulating medium 3. As in the case of Figs. 1 and 2, the secondary resistance loads are varied by straining of the wire filaments and the resulting secondary electrical changes reflected in the primary winding 7a and 7b.

The embodiment of the invention of Fig. 3 provides certain advantages over that of Figs. 1 and 2 in that a greater latitude in the disposition of the strain-reactive wire filaments is possible to more efficiently sense shaft torque. In addition this device lends itself more conveniently to design in that the primary and secondary windings may be designed for maximum coupling efficiency without regard to the amount of resistance the secondary may have as a result of its wire length. The desired resistance load of the secondary is determined independently of such considerations.

It will be observed that the foregoing construction provides two devices such as shown in Figs. 1 or 2, each of which embodies the fundamental principles of this invention. Each of these devices is preferably constructed so that their electrical properties are identical, that is, the corresponding coils of the strain-reactive devices are made of identical wire materials and have the same number of turns, and the physical dimensions and materials of the magnetic circuits are the same. In short, the only difference in the two strain-sensitive devices of Fig. 3 resides in the physical arrangement of the wire filaments. The helix of the one wire filament being reversed from that connected to the other secondary winding.

Should the electrical properties of the shaft be poor and apt to be of a variable nature over the shaft gauge length of the device, the use of the sleeves 3a as short-circuited windings provide a ready means for eliminating electrical bridge unbalances caused by these variable electrical properties. The individual sleeves in this application function in a manner similar to the sleeves 3a of Figs. 1 and 2. Hence, further description regarding their operation on the device of Fig. 3 is believed unnecessary.

Assuming torque is being transmitted by the shaft in a counterclockwise direction from left to right thereof, it will be observed that each increment of length of the strain-reactive wire filaments is subjected to a strain. One of the wire filaments, for example, the wire filament 4a being subjected to a compression load whereas the wire filament 4b is subjected to a tension load. The resistance of the wire filament 4a decreases in compression and the resistance of the wire filament 4b increases in tension. As a result, this electrical change is reflected in the primary windings to produce an unbalance thereof and the indication of the shaft torque obtained on the indicating instrument 11.

Since the primary windings are identical, the secondary windings are identical except for the manner in which the strain-reactive elements are wound and the magnetic circuits for the two strain-responsive devices are identical, changes in ambient temperature equally effects both primary windings. Similarly end thrust of the shaft producing either a tension or compression loading thereof strains both wire filaments in the same direction. For compression loading of the shaft, both wire filaments are equally strained in compression. The converse is true in the case of a tension loading of the shaft. Shaft bending is largely compensated in the wire filaments because of the symmetrical distribution of the wire filament turns with respect to the shaft axis. Further, compensation is had in Fig. 3 since both wire filaments are equally affected by shaft bending. Consequently, the secondary winding changes reflected in the primary windings are identical. Since the primary windings are connected in adjacent legs of a bridge circuit and their response to these unwanted changes is identical, the bridge circuit remains electrically balanced. As a result of this compensation for unwanted electrical changes, the only electrical changes which unbalance the bridge circuit are those resulting from straining of the shaft in torsion.

The foregoing disclosure and the showings made in the drawing are merely illustrative of the principles of this invention and are not to be considered in a limiting sense. The only limitations are to be determined from the scope of the appended claims.

I claim as my invention:

1. In a device for sensing the mechanical strain of a shaft, the combination of, a stationary annular primary winding concentrically disposed with respect to said shaft, a short circuited secondary winding at least in part inductively related to said primary winding and supported to rotate with said shaft, said secondary winding comprising at least in part a wire filament having electrical properties which are varied upon straining thereof, said wire filament being supported to be strained by straining movements of said shaft, and means for magnetically shielding said primary winding from said shaft.

2. In a device for sensing the mechanical strain of a shaft, the combination of, a stationary annular primary winding encircling said shaft, a sleeve of material of high electrical conductivity secured about said shaft within said annular primary winding, a short-circuited secondary winding at least in part inductively related to the primary winding and supported about said sleeve to rotate with said shaft, said secondary winding comprising at least in part a wire filament having electrical properties which are varied upon straining thereof, said wire filament being supported to be strained by straining movements of said shaft.

3. In a device for sensing the mechanical strain of a shaft the combination of, a sleeve of material of high electrical conductivity secured about said shaft to be strained by straining movements of said shaft, a wire filament having electrical properties which are varied upon straining thereof insulatedly secured to said sleeve to be strained thereby, said wire filament being wound in the form of a helix about said sleeve in one direction only and having its extremities electrically joined together, and means inductively related to said wire filament for inducing an electrical quantity therein.

4. In a device for sensing the mechanical strain of a shaft the combination of, a sleeve of material of high electrical conductivity secured about said shaft to be strained by straining movements of said shaft, a wire filament having electrical properties which are varied upon straining thereof insulatedly secured to said sleeve to be strained thereby, said wire filament being wound in the form of a helix about said sleeve in one direction only and having its extremities electrically joined together, and a stationary winding encircling said wire filament and inductively related thereto.

5. In a device for sensing the mechanical strain of a shaft the combination of, a sleeve of material of high electrical conductivity secured about said shaft to be strained by straining movements of said shaft, a wire filament having electrical properties which are varied upon straining thereof insulatedly secured to said sleeve to be strained thereby, said wire filament being wound in the form of a helix about said sleeve in one direction only, an electrical conductor extending substantially parallel to the axis of said shaft and electrically joining the extremities of said wire filament, and means inductively related to said wire filament for inducing an electrical quantity therein.

6. In a device for sensing the mechanical strain of a shaft the combination of, a sleeve of material of high electrical conductivity secured about said shaft to be strained by straining movements of said shaft, a wire filament having electrical properties which are varied upon straining thereof insulatedly secured to said sleeve to be strained thereby, said wire filament being wound in the form of a helix about said sleeve in one direction only, an electrical conductor extending substantially parallel to the axis of said shaft and electrically joining the extremities of said wire filament, and a stationary winding encircling said wire filament and inductively related thereto.

BERNARD F. LANGER.

REFERENCES CITED

The following references are of record in the file of this patent:

UNITED STATES PATENTS

| Number | Name | Date |
|---|---|---|
| 2,292,549 | Simmons | Aug. 11, 1942 |
| 2,318,361 | Bischoff | May 4, 1943 |
| 1,961,783 | Roder | June 5, 1934 |
| 2,365,565 | Langer | Dec. 19, 1944 |
| 2,260,036 | Kuehni | Oct. 21, 1941 |

FOREIGN PATENTS

| Number | Country | Date |
|---|---|---|
| 470,454 | Germany | Jan. 15, 1929 |